United States Patent
Yoshida

(10) Patent No.: US 10,562,467 B2
(45) Date of Patent: Feb. 18, 2020

(54) BONDING STRUCTURE, IMAGING APPARATUS, AND ON-VEHICLE CAMERA

(71) Applicant: KYOCERA Corporation, Kyoto (JP)

(72) Inventor: Takashi Yoshida, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/093,661

(22) PCT Filed: Jan. 27, 2017

(86) PCT No.: PCT/JP2017/003043
§ 371 (c)(1),
(2) Date: Oct. 15, 2018

(87) PCT Pub. No.: WO2017/187690
PCT Pub. Date: Nov. 2, 2017

(65) Prior Publication Data
US 2019/0126848 A1    May 2, 2019

(30) Foreign Application Priority Data
Apr. 28, 2016 (JP) .................................. 2016-091596

(51) Int. Cl.
*B60R 11/04* (2006.01)
*G03B 17/02* (2006.01)
(Continued)

(52) U.S. Cl.
CPC ............... *B60R 11/04* (2013.01); *G02B 7/02* (2013.01); *G03B 17/02* (2013.01); *H04N 5/2252* (2013.01);
(Continued)

(58) Field of Classification Search
CPC ............ B60R 11/04; B60R 2011/0049; B60R 2011/0003; B60R 2011/0026;
(Continued)

(56) References Cited

U.S. PATENT DOCUMENTS 7,646,423 B2 *   1/2010   Yoshida ............. G06K 9/00033
                                                   348/370
8,810,722 B2 *   8/2014   Hirooka ............ H01L 27/14618
                                                   348/335

(Continued)

FOREIGN PATENT DOCUMENTS

JP        2001-251045 A     9/2001

*Primary Examiner* — Luong T Nguyen
(74) *Attorney, Agent, or Firm* — Studebaker & Brackett PC

(57) ABSTRACT

A bonding structure for fixing a plate member inside a housing storing the plate member includes an opening, a fixing portion, adhesive, and a transmissive portion. The opening connects a first space surrounded by the housing and a first surface of the plate member facing the housing with a second space located by a second surface of the plate member opposite the first surface. The fixing portion faces the first surface, is positioned in accordance with the opening, and includes an ultraviolet transmissive material. The adhesive is ultraviolet curing adhesive located at the opening and fixing the fixing portion and the plate member to each other. The transmissive portion is located at the periphery of a side surface of the plate member and transmits ultraviolet light.

9 Claims, 9 Drawing Sheets

(51) Int. Cl.
  *G02B 7/02* (2006.01)
  *H04N 5/225* (2006.01)
  *B60R 11/00* (2006.01)

(52) U.S. Cl.
  CPC ......... *H04N 5/2253* (2013.01); *H04N 5/2254* (2013.01); *B60R 2011/0003* (2013.01); *B60R 2011/0026* (2013.01); *B60R 2011/0049* (2013.01)

(58) Field of Classification Search
  CPC .. H04N 5/2252; H04N 5/2253; H04N 5/2254; G02B 7/02; G03B 17/02
  See application file for complete search history.

(56) References Cited

U.S. PATENT DOCUMENTS

2007/0047109 A1\* 3/2007 Shibata ................ H04N 5/2254
                                                                       359/819
2009/0295985 A1\* 12/2009 Nakamura ........... H04N 5/2252
                                                                       348/373
2010/0141825 A1\* 6/2010 Kim ................. H01L 27/14618
                                                                       348/340

\* cited by examiner

BONDING STRUCTURE, IMAGING APPARATUS, AND ON-VEHICLE CAMERA

CROSS-REFERENCE TO RELATED APPLICATION

The present application claims priority to and the benefit of Japanese Patent Application No. 2016-091596 filed Apr. 28, 2016, the entire contents of which are incorporated herein by reference.

TECHNICAL FIELD

The present disclosure relates to a bonding structure, an imaging apparatus, and an on-vehicle camera that fix a plate member inside a housing storing the plate member.

BACKGROUND

The use of adhesive to fix components in a lens unit of an imaging apparatus is known.

For example, to mount a substrate of the lens unit onto a housing, adhesive is applied in advance to a portion of the housing, and the substrate is fixed and attached to the housing with the applied adhesive therebetween. Just after being applied to a portion of the substrate, the adhesive is soft. The substrate is bonded to the soft adhesive. The adhesive applied to the housing and bonded to the substrate is ultraviolet curing adhesive that hardens when irradiated with ultraviolet light. The substrate is thus attached and fixed to the housing.

SUMMARY

A bonding structure according to an embodiment of the present disclosure is for fixing a plate member inside a housing storing the plate member. The bonding structure includes an opening, a fixing portion, adhesive, and a transmissive portion. The opening connects a first space, surrounded by the housing and a first surface of the plate member facing the housing, with a second space located by a second surface of the plate member opposite the first surface. The fixing portion faces the first surface, is positioned in accordance with the opening, and includes an ultraviolet transmissive material. The adhesive is ultraviolet curing adhesive, located at the fixing portion and the opening, that fixes the fixing portion and the plate member to each other. The transmissive portion is located at a periphery of a side surface of the plate member and transmits ultraviolet light.

An imaging apparatus according to an embodiment of the present disclosure includes a substrate, an imaging optical system, an image sensor mounted on the substrate, a housing storing the substrate, the image sensor, and the imaging optical system, and a bonded structure fixing the substrate in the housing. The bonded structure includes an opening, a fixing portion, adhesive, and a transmissive portion. The opening connects a first space, surrounded by the housing and a first surface of the substrate facing the housing, with a second space located by a second surface of the substrate opposite the first surface. The fixing portion faces the first surface, is positioned in accordance with the opening, and includes an ultraviolet transmissive material. The adhesive is ultraviolet curing adhesive, located at the opening, that fixes the fixing portion and the substrate to each other. The transmissive portion is located at a periphery of a side surface of the substrate and transmits ultraviolet light.

An on-vehicle camera according to an embodiment of the present disclosure includes an imaging apparatus. The imaging apparatus includes a substrate, an imaging optical system, an image sensor mounted on the substrate, a housing storing the substrate, the image sensor, and the imaging optical system, and a bonded structure fixing the substrate in the housing. The bonded structure includes an opening, a fixing portion, adhesive, and a transmissive portion. The opening connects a first space, surrounded by the housing and a first surface of the substrate facing the housing, with a second space located by a second surface of the substrate opposite the first surface. The fixing portion faces the first surface, is positioned in accordance with the opening, and includes an ultraviolet transmissive material. The adhesive is ultraviolet curing adhesive, located at the opening, that fixes the fixing portion and the substrate to each other. The transmissive portion is located at a periphery of a side surface of the substrate and transmits ultraviolet light.

Advantageous Effect

An embodiment of the present disclosure allows the time for fixing a substrate to a plate member to be shortened.

DETAILED DESCRIPTION

When ultraviolet curing adhesive is used to fix a substrate or other such plate member to a housing, the plate member is sometimes attached to the housing using adhesive on the opposite side from the side irradiated by ultraviolet light. In this case, the ultraviolet light is sometimes blocked by the plate member and fails to reach the adhesive. Since the imaging optical system is designed and arranged so that light transmitted by the imaging optical system is collected on an image sensor, the incident ultraviolet light transmitted by the imaging optical system does not easily reach the adhesive.

Consequently, hardening of the ultraviolet curing adhesive does not progress, making it difficult to shorten the time for fixing the plate member.

The present disclosure can shorten the time for fixing a plate member to a housing.

First Embodiment

The first embodiment of the present disclosure is now described with reference to the drawings.

Figure 1:
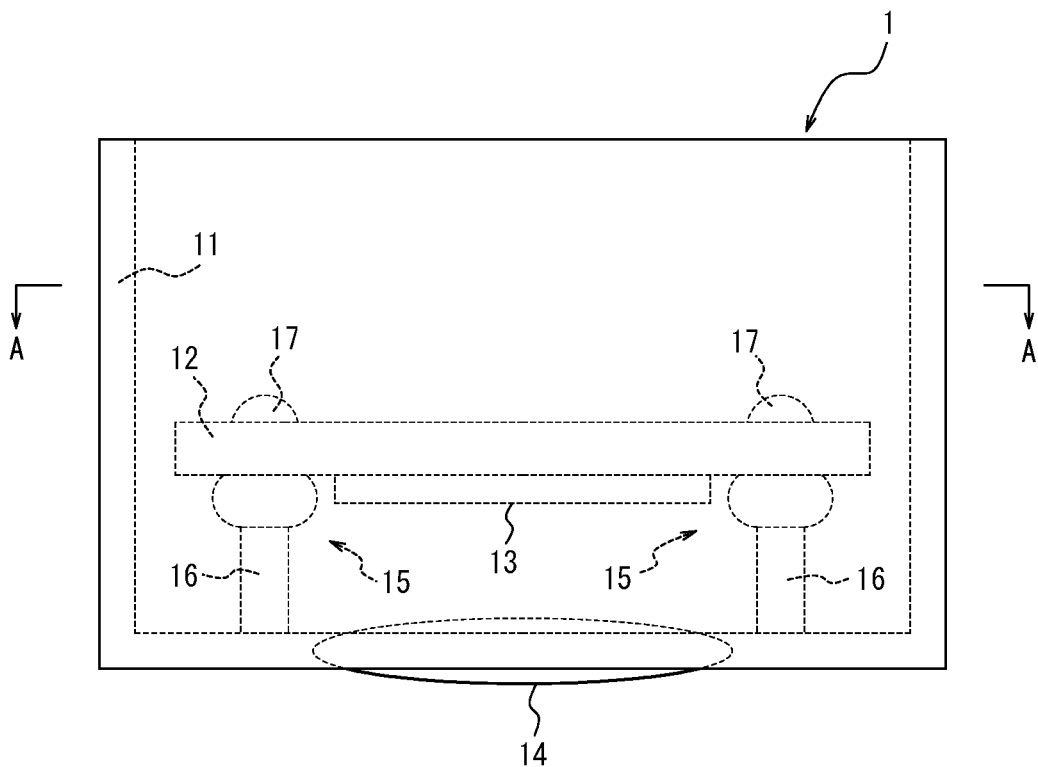
FIG. 1 is a side view of the appearance of a lens unit in a first embodiment.

As illustrated in FIG. 1, a lens unit 1 according to the first embodiment includes a housing 11, a substrate 12 (plate member), an image sensor 13, an imaging optical system 14, a bonding structure 15 (bonded structure), and the like. The housing 11 stores the substrate 12. The housing 11 and the substrate 12 are fixed by the bonding structure 15, which uses a fixing portion 16, adhesive 17, and the like.

Figure 2:
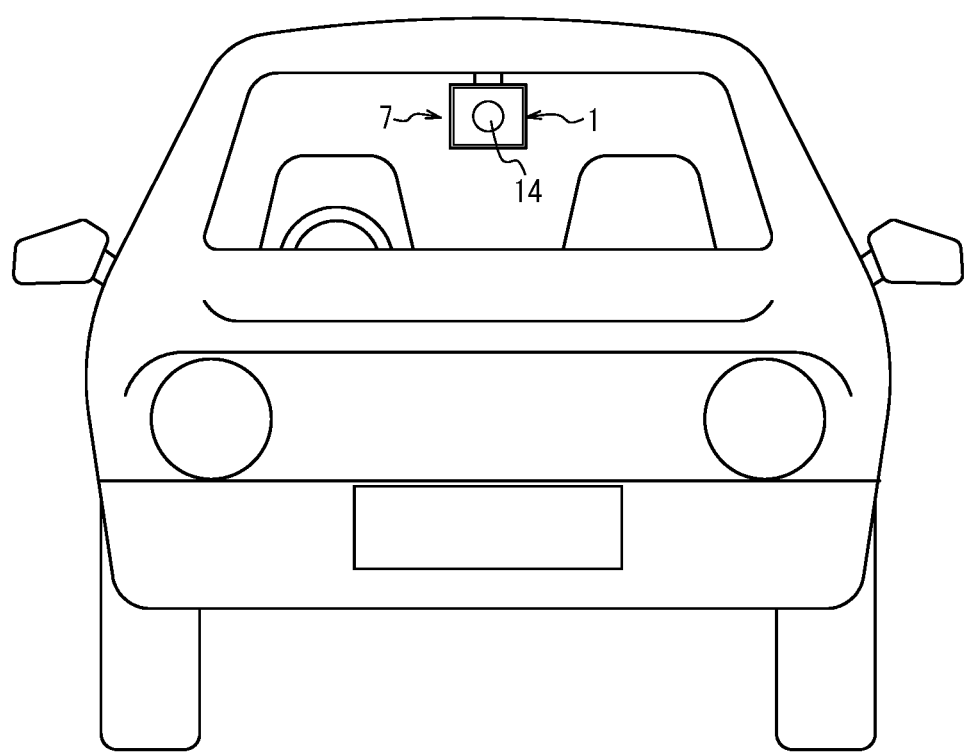
FIG. 2 is a front view schematically illustrating a vehicle in which an imaging apparatus including the lens unit in FIG. 1 is mounted as an on-vehicle camera.

As illustrated in FIG. 2, the lens unit 1 constitutes an imaging apparatus 7 along with a processor for image processing, a memory, and the like. The imaging apparatus 7 is, for example, mounted in a vehicle 8 as an on-vehicle camera. In FIG. 2, the imaging apparatus 7 is mounted to capture images in the travel direction of the vehicle 8, but this example is not limiting. The imaging apparatus 7 may, for example, be mounted to capture images to the rear or the sides of the travel direction.

When the housing 11 is attached to the substrate 12 during assembly of the lens unit 1, the housing 11 has an opening on a surface that is across the substrate 12 from a surface of the housing 11 parallel to the surface of the substrate 12. In the following explanation, the side of the housing 11 that is open to the outside (the top in FIG. 1) during attachment of the substrate 12 to the housing 11 is considered to be the top.

Figure 3:
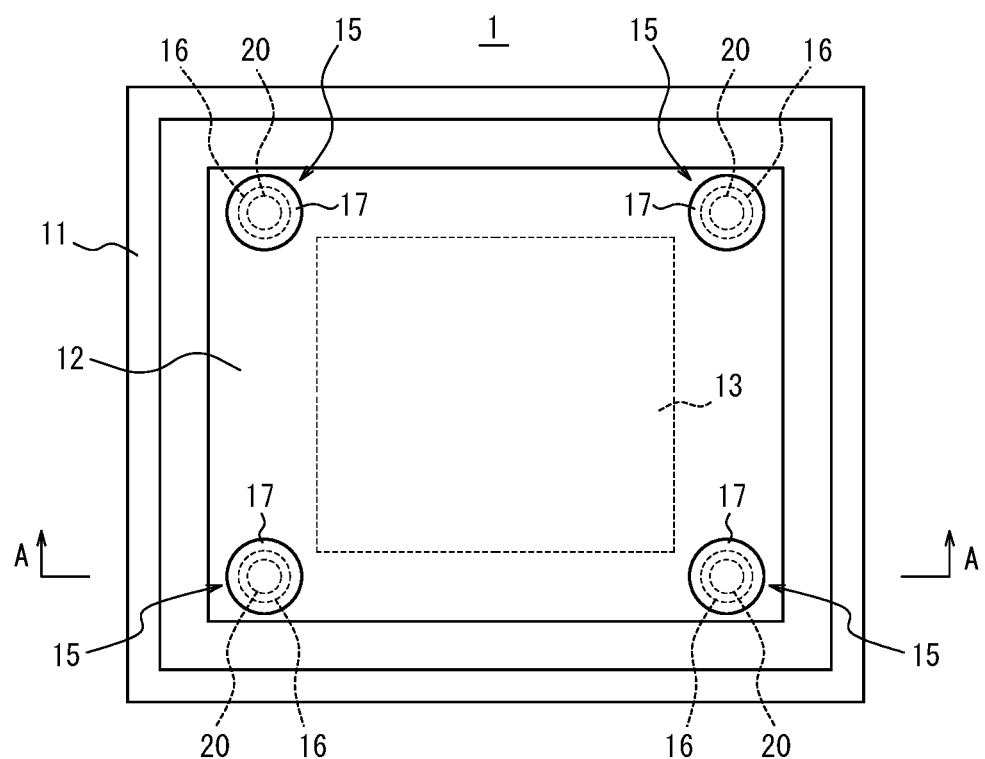
FIG. 3 is a top view of the lens unit in FIG. 1.

As illustrated in FIG. 3, the housing 11 and the substrate 12 are rectangular when viewed from above. The substrate 12 is attached and fixed to fixing portions 16 located adjacent to the four corners of the housing 11. The housing 11 and the substrate 12 are not limited to being rectangular when viewed from above and may have any shape, such as a circular or elliptical shape.

Figure 4:
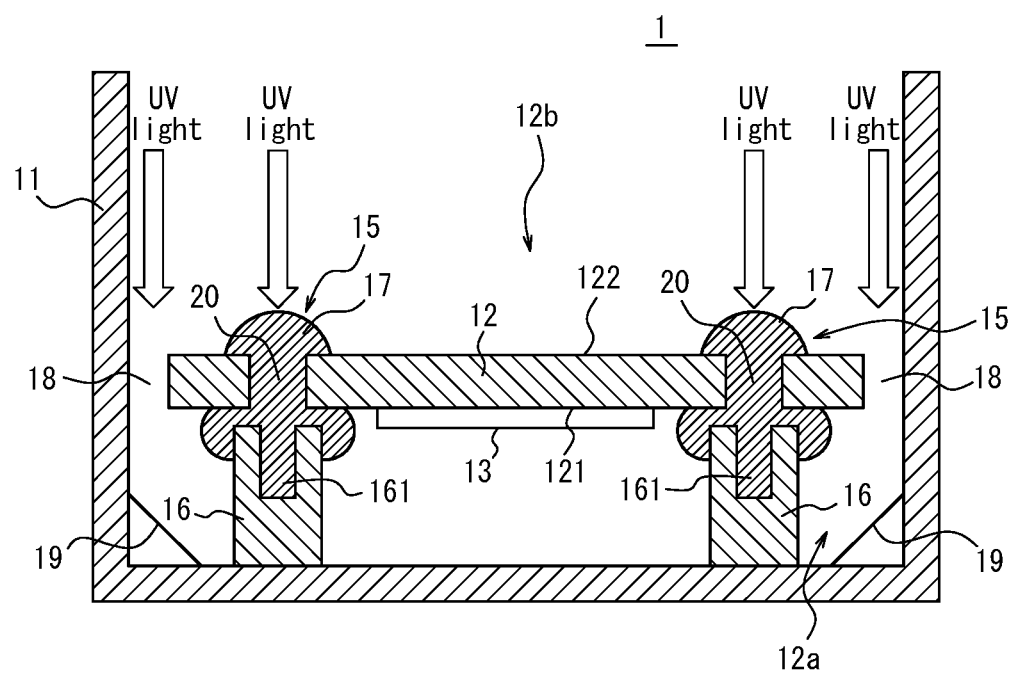
FIG. 4 is a cross-section of the lens unit in FIG. 3.

As illustrated in FIG. 4, the housing 11 stores the substrate 12 and is structured integrally with the fixing portion 16 that fixes the substrate 12. The housing 11 has the shape of a rectangular parallelepiped. The imaging optical system 14 illustrated in FIG. 1 is omitted from FIG. 4.

The substrate 12 is a plate member to which the image sensor 13 is attached. The substrate 12 has a first surface 121 facing the housing 11 and a second surface 122 on the opposite side from the first surface 121. The substrate 12 is fixed and attached to the fixing portion 16 by ultraviolet curing adhesive 17. The adhesive 17 is, for example, resin.

The image sensor 13 is attached to the lower surface of the substrate 12. A charge-coupled device (CCD) image sensor or a complementary metal oxide semiconductor (CMOS) image sensor may be used in the image sensor 13. Light that passes through the imaging optical system 14 and is incident on the image sensor 13 is formed into an image, and the light of the image undergoes photoelectric conversion.

The imaging optical system 14 in FIG. 1 is configured to include one or more optical elements with light-collecting properties, such as lenses, in the lower portion of the housing 11. The imaging optical system 14 is arranged so that incident light forms an image on the image sensor 13.

As illustrated in FIG. 4, the bonding structure 15 includes openings, the fixing portions 16 provided integrally with the housing 11, the adhesive 17, a transmissive portion 18 located at the periphery of the side surface of the substrate 12, and the like. The openings are through-holes 20 provided in the substrate 12.

The through-holes 20 pass through the substrate 12 so as to connect a first space 12a, surrounded by the first surface 121 of the substrate 12 and the housing 11, with a second space 12b on the second surface 122 side.

The fixing portions 16 are members for fixing that are formed integrally with the housing 11 and are made of ultraviolet transmissive material that transmits ultraviolet light. Instead of being formed integrally with the housing 11, the fixing portions 16 may be members for fixing attached to the housing 11. The fixing portions 16 are positioned facing the first surface 121 of the substrate 12 in accordance with the through-holes 20. In the example in FIG. 4, the fixing portions 16 are arranged within the first space 12a so that one end of each fixing portion 16 is integral with the bottom of the housing 11 and the other end faces the through-hole 20.

Each fixing portion 16 has a hole 161 from the section of the fixing portion 16 facing the substrate 12 towards the housing 11.

When the fixing portions 16 are integral with the housing 11, the housing 11 and the fixing portions 16 can be formed by two-color molding. Specifically, after the fixing portions 16 are formed from an ultraviolet transmissive material with a primary mold, the housing 11 including light-blocking material is formed with a secondary mold.

The adhesive 17 is ultraviolet curing adhesive. The adhesive 17 is positioned in the openings of the substrate 12 and hardened to fix the substrate 12 and the fixing portion 16 to each other. Specifically, the adhesive 17 is poured into the holes 161 of the fixing portions 16 during attachment of the substrate 12 to the housing 11 and is continuously applied from the holes 161 to the upper side and outside of the fixing portions 16. The adhesive 17 applied to the upper side and outside of the fixing portions 16 is applied continuously to positions on the first surface 121 of the substrate 12 near the through-holes 20. Furthermore, the adhesive 17 is applied continuously from the positions on the first surface 121 of the substrate 12 near the through-holes 20 into the through-holes 20 to positions on the second surface 122 of the substrate 12 near the through-holes 20. At the time of completion of the bonding structure 15, the adhesive 17 is therefore located continuously in a hardened state in the holes 161, at the upper side and outside of the fixing portions 16, on the first surface 121 and the second surface 122 of the substrate 12 near the through-holes 20, and inside the through-holes 20.

The transmissive portion 18 is a portion that transmits ultraviolet light, which enters the second space 12b from outside the housing 11 at the time of attachment of the substrate 12 to the housing 11, into the first space 12a. The transmissive portion 18 is located at the periphery of the side surface of the substrate 12 and may be an empty space or be filled with ultraviolet transmissive material.

As illustrated in FIG. 4, the lens unit 1 may include a reflector 19. The reflector 19 reflects ultraviolet light that enters the second space 12b from the outside at the time of attachment of the substrate 12 to the housing 11 and is transmitted by the transmissive portion 18. The reflector 19 is arranged to reflect the ultraviolet light towards a bonding portion. The bonding portion is the portion, between the substrate 12 and the fixing portions 16, where the adhesive 17 is applied. In the example in FIG. 4, the reflector 19 is arranged within the first space 12a at the corner between the inner side surface and the bottom of the housing 11.

In the first embodiment, the bonding structure 15 has a portion open to the outside at the time of attachment of the substrate 12 to the housing 11 during assembly of the lens unit 1. Consequently, ultraviolet light can enter the second space 12b of the housing 11 from the outside. The ultraviolet light entering the second space 12b passes through the through-holes 20 in the substrate 12. Hardening of the adhesive 17 injected inside the through-holes 20 can thus be promoted. Furthermore, the fixing portions 16 include ultraviolet transmissive material. Accordingly, the ultraviolet light that passes through the through-holes 20 and reaches the upper side and the hole 161 of the fixing portions 16 passes through the fixing portions 16 to reach the outside of the fixing portions 16. The adhesive 17 adhered to the outside of the fixing portions 16 is therefore easily irradiated by ultraviolet light, promoting hardening of the adhesive 17.

In the first embodiment, the bonding structure 15 includes the transmissive portion 18 that is located at the periphery of the side surface of the substrate 12 and transmits ultraviolet light. The ultraviolet light that enters the second space 12b at the time of attachment of the substrate 12 to the housing 11 is therefore transmitted by the transmissive portion 18 and enters the first space 12a directly or is reflected within the first space 12a one or more times. The ultraviolet light then reaches the outside of the fixing portions 16 arranged in the first space 12a. Hardening of the adhesive 17 applied to the outside of the fixing portions 16 is therefore promoted. Furthermore, since the fixing portions 16 include ultraviolet transmissive material as described above, the ultraviolet light reaching the outside of the fixing portions 16 passes through the fixing portions 16 and irradiates the adhesive 17 injected into the holes 161 of the fixing portions 16. The hardening of the adhesive 17 in the holes 161 is therefore promoted.

In the first embodiment, when the fixing portions 16 are integral with the housing 11, the housing 11 and the fixing portions 16 are formed by two-color molding. This makes it unnecessary to consider the accumulated tolerance of the housing 11 and the fixing portions 16 and can prevent a decrease in strength due to fixing.

In the first embodiment, the reflector 19 reflects ultraviolet light that enters the second space 12b from the outside and is transmitted by the transmissive portion 18. The reflector 19 is arranged to reflect the ultraviolet light towards the bonding portion between the fixing portions 16 and the substrate 12. A larger amount of ultraviolet light therefore reaches the outside of the fixing portions 16 and irradiates the adhesive 17.

In the first embodiment, the adhesive 17 is located in the hole 161 and is continuous with the adhesive 17 located at the upper side and outside of the fixing portion 16, where the substrate 12 is fixed to the adhesive 17. The holes 161 and the hardened adhesive 17 therefore fit together, so that the fixing portions 16 and the substrate 12 are firmly fixed without the adhesive 17 peeling off from the fixing portions 16.

Second Embodiment

Next, the second embodiment of the present disclosure is described with reference to the drawings.

Like the lens unit 1 according to the first embodiment, a lens unit 2 according to the second embodiment includes a housing 11, a substrate 12, an image sensor 13, an imaging optical system 14, a bonding structure 15, and the like. The lens unit 2 may further include a reflector 19. The bonding structure 15 differs from the first embodiment by further including a light guide 21 that includes ultraviolet transmissive material and guides ultraviolet light, as illustrated in FIG. 5.

Figure 5:
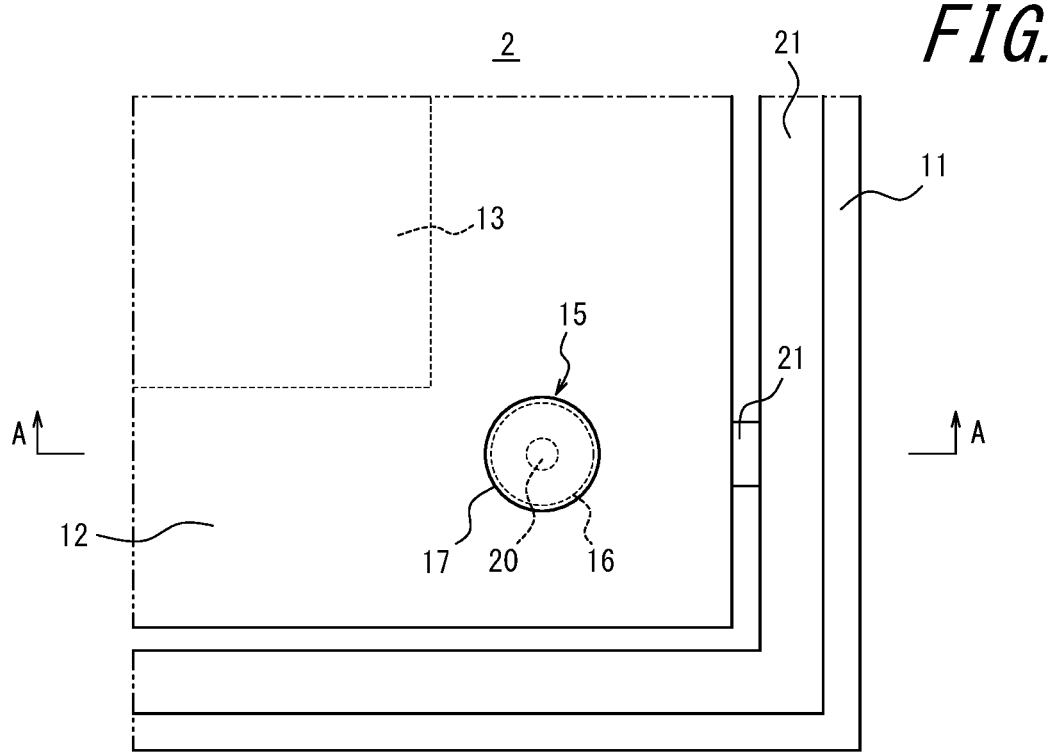
FIG. 5 is a top view of a portion of a lens unit in a second embodiment.
Figure 6:
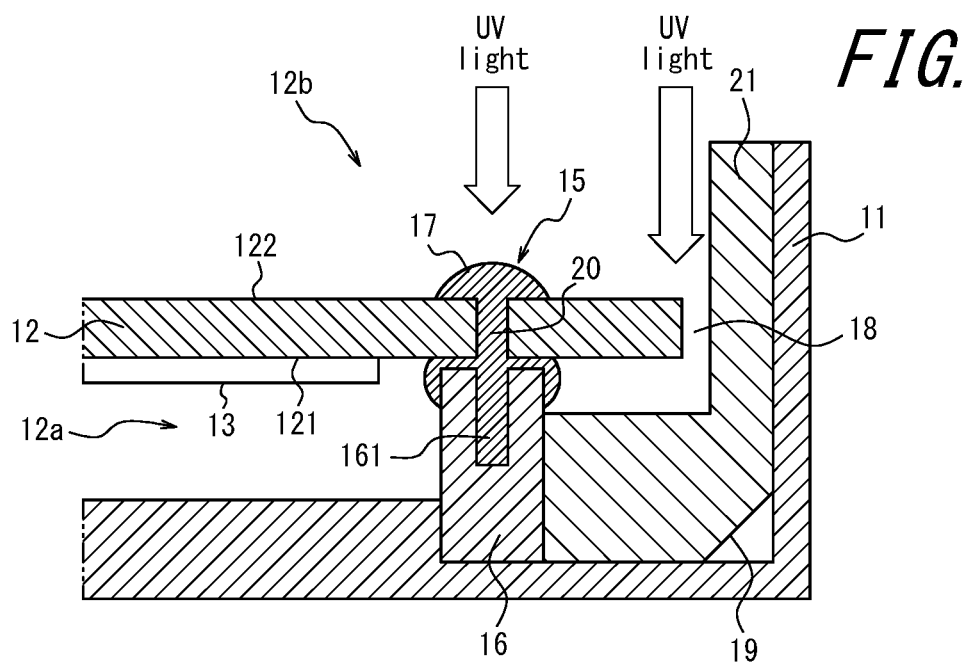
FIG. 6 is a cross-section of a portion of the lens unit in FIG. 5.

The light guide 21 is arranged to be spatially continuous from the second space 12b to the fixing portion 16 of the first space 12a, as illustrated in FIG. 6, which is a cross-section along the AA line of FIG. 5. The imaging optical system 14 is omitted from FIGS. 5 and 6. In the example in FIG. 6, the light guide 21 is arranged along the inner side surface of the housing 11, in contact with the inner side surface and the bottom of the housing 11 in the first space 12a. The light guide 21 is thus arranged to be spatially continuous from the second space 12b to the fixing portions 16. The light guide 21 may be integral with the fixing portion 16 or arranged to be in contact with the fixing portion 16.

The remaining structure and effects of the second embodiment are the same as those of the first embodiment. Hence, the same or corresponding constituent elements are labeled with the same reference signs, and a description thereof is omitted.

At the time of attachment of the substrate 12 to the housing 11, the second embodiment allows ultraviolet light to reach the outside of the fixing portions 16 from the transmissive portion 18 and irradiate the adhesive 17. Therefore, as in the first embodiment, hardening of the adhesive 17 is promoted. Furthermore, the ultraviolet light entering the second space 12b from outside the housing 11 is guided by the light guide 21, thereby reaching the fixing portions 16 arranged in the first space 12a more easily. A greater amount of ultraviolet light is thus irradiated on the adhesive 17, further promoting hardening of the adhesive 17.

Third Embodiment

Next, the third embodiment of the present disclosure is described with reference to the drawings.

Figure 7:
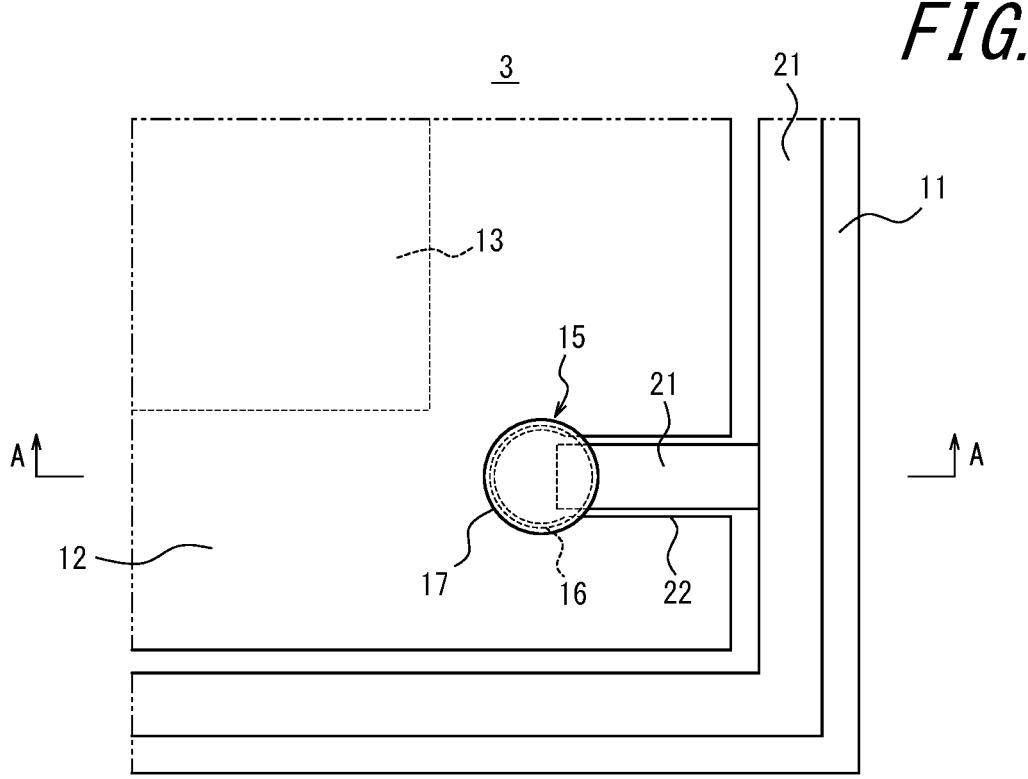
FIG. 7 is a top view of a portion of a lens unit in a third embodiment.

Like the lens unit 2 according to the second embodiment, a lens unit 3 according to the third embodiment includes a housing 11, a substrate 12, an image sensor 13, an imaging optical system 14, a bonding structure 15, and the like. The lens unit 3 may further include a reflector 19. The bonding structure 15 according to the present embodiment includes an opening provided on the substrate 12, fixing portions 16 provided integrally with the housing 11, adhesive 17, and a transmissive portion 18 located at the periphery of the side surface of the substrate 12, as illustrated in FIG. 7. The fixing portions 16 may be members for fixing that are attached to the housing 11. The opening according to the present embodiment is a notched recess 22 provided in a portion of the outer edge of the substrate 12, thus differing from the lens unit 2 according to the second embodiment. The imaging optical system 14 is omitted from FIGS. 7 and 8.

In the example in FIG. 7, the notched recess 22 has the shape, in top view, of a linear cutout between a peripheral portion of a circular opening provided in the substrate 12 and the closest peripheral portion of the substrate 12. The linear cutout has a fixed width smaller than the diameter of the circular opening. The width is the length in the direction orthogonal to the direction from the peripheral portion of the circular opening to the closest peripheral portion of the substrate 12. The fixing portion 16 is positioned facing the first surface 121 of the substrate 12 in accordance with the circular opening of the notched recess 22.

Figure 8:
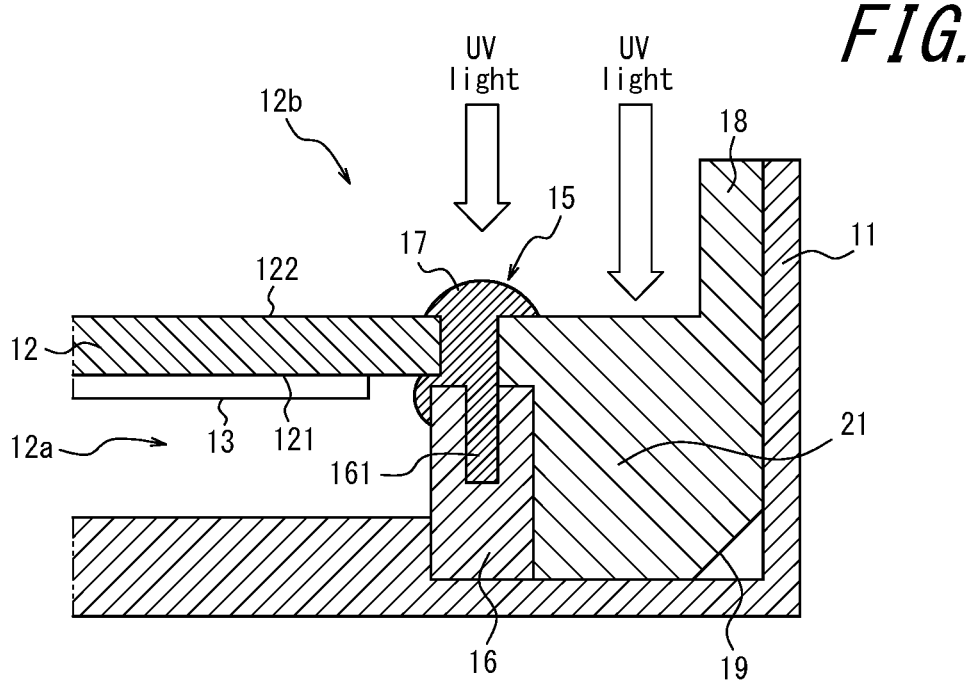
FIG. 8 is a cross-section of a portion of the lens unit in FIG. 7.

As in the second embodiment, the light guide 21 is made of ultraviolet transmissive material. The light guide 21 is partially positioned in the notched recess 22 of the substrate 12. The light guide 21 is arranged to be spatially continuous as a rib from the notched recess 22 to the inner side surface of the housing 11, as illustrated in FIG. 8, which is a cross-section along the AA line of FIG. 7. Consequently, the notched recess 22 of the substrate 12 and the light guide 21 arranged as a rib fit together, as illustrated in FIG. 7. Furthermore, the light guide 21 is spatially continuous from the recess 22 of the substrate 12 to the bottom of the housing 11 and is adhered to the adhesive 17 located at the second surface 122 of the substrate 12.

The remaining structure and effects of the third embodiment are the same as those of the second embodiment. Hence, the same or corresponding constituent elements are labeled with the same reference signs, and a description thereof is omitted.

The third embodiment allows ultraviolet light entering the second space 12b from the outside at the time of attachment of the substrate 12 to the housing 11 to be guided to the light guide 21 arranged in the transmissive portion 18 between the housing 11 and the substrate 12. The ultraviolet light is also guided by the light guide 21 arranged in the notched recess 22 to reach the fixing portion 16 of the first space 12a. A greater amount of ultraviolet light is thus irradiated on the adhesive 17, further promoting hardening of the adhesive 17.

Furthermore, the notched recess 22 of the substrate 12 and the light guide 21 arranged as a rib fit together in the third embodiment, allowing the substrate 12 to be fixed to the housing 11 more firmly.

Fourth Embodiment

Next, the fourth embodiment of the present disclosure is described with reference to the drawings.

Figure 9:
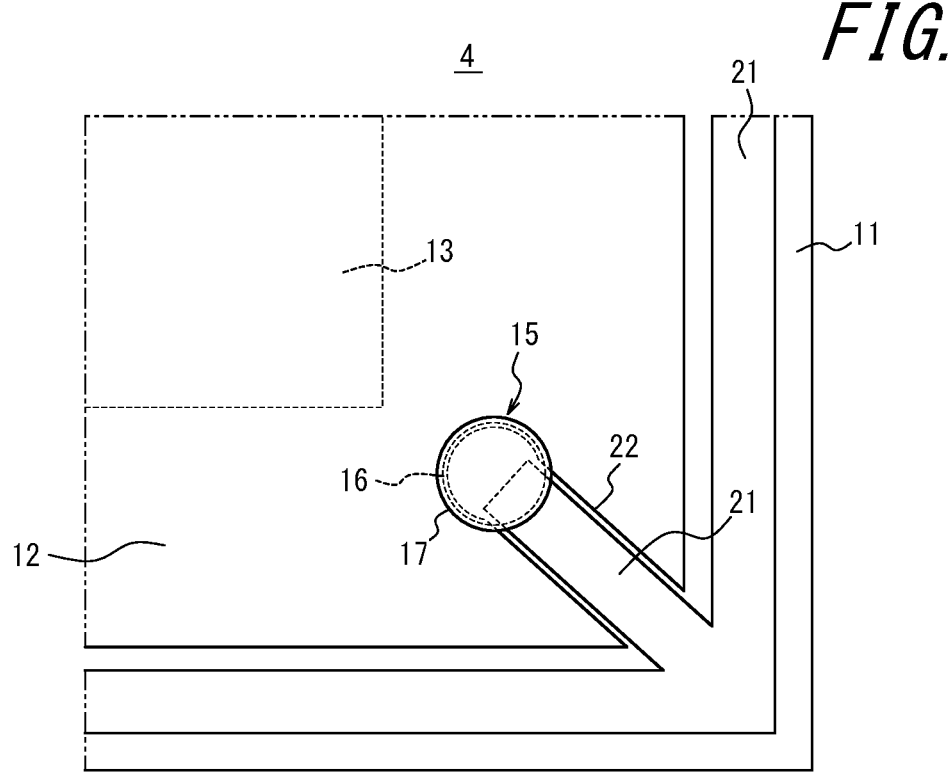
FIG. 9 is a top view of a portion of a lens unit in a fourth embodiment.

Like the lens unit 3 according to the third embodiment, a lens unit 4 according to the fourth embodiment includes a housing 11, a substrate 12, an image sensor 13, an imaging optical system 14, a bonding structure 15, and the like. The lens unit 4 may further include a reflector 19. The bonding structure 15 includes fixing portions 16, adhesive 17, a light guide 21, and a notched recess 22. As illustrated in FIG. 9, the notched recess 22 differs from the third embodiment by being spatially continuous from the through-hole 20 to the inner corner of the housing 11, rather than to the inner side surface of the housing 11. The imaging optical system 14 is omitted from FIG. 9.

The remaining structure and effects of the fourth embodiment are the same as those of the third embodiment. Hence, the same or corresponding constituent elements are labeled with the same reference signs, and a description thereof is omitted.

The fourth embodiment allows a greater amount of ultraviolet light to irradiate the adhesive 17 at the time of attachment of the substrate 12 to the housing 11, thereby further promoting hardening of the adhesive 17. As in the third embodiment, the substrate 12 is firmly fixed to the housing 11.

Fifth Embodiment

Next, the fifth embodiment of the present disclosure is described with reference to the drawings.

Figure 10:
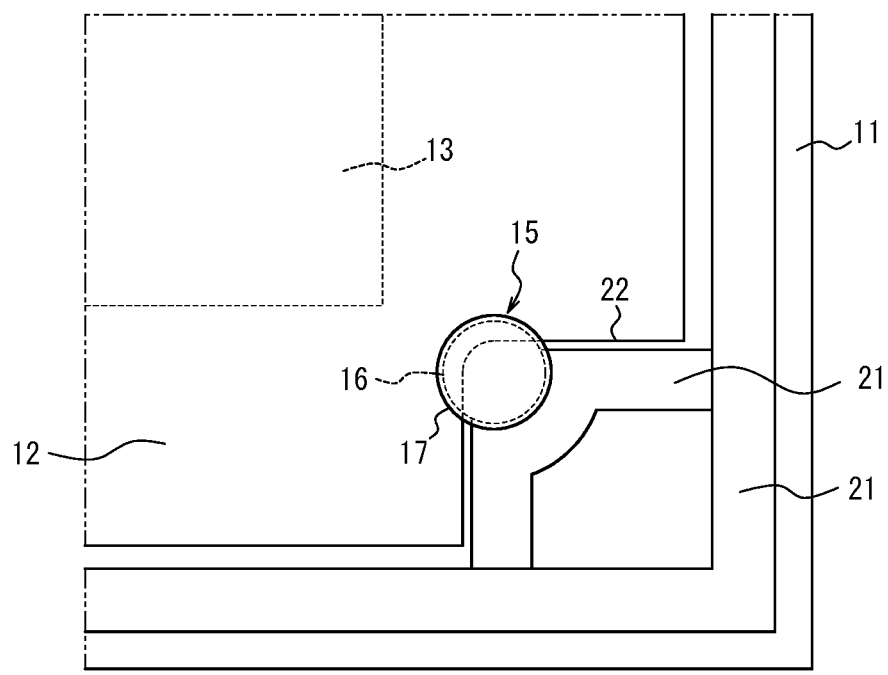
FIG. 10 is a top view of a portion of a lens unit in a fifth embodiment.

Like the lens unit 3 according to the third embodiment, a lens unit 5 according to the fifth embodiment includes a housing 11, a substrate 12, an image sensor 13, an imaging optical system 14, a bonding structure 15, and the like. The bonding structure 15 includes fixing portions 16, adhesive 17, a light guide 21, and a notched recess 22. As illustrated in FIG. 10, the notched recess 22 is a substantially rectangular notch in the right angle corner of the substrate 12, with opposing vertices at the position corresponding to the fixing portion 16 and the adjacent vertex of the substrate 12. The imaging optical system 14 is omitted from FIG. 10.

As described in the second embodiment, the light guide 21 is arranged along the inner side surface of the housing 11 and at the inside bottom of the housing 11 in the first space 12a. The light guide 21 is thus arranged to be spatially continuous from the second space 12b to the fixing portion 16. Furthermore, the light guide 21 is arranged along the outer edge forming the notched recess 22 of the substrate 12, from the fixing portion 16 to two side surfaces of the housing 11 positioned at right angles to each other. The light guide 21 arranged along the outer edge forming the notched recess 22 of the substrate 12 thus functions as a rib, so that the substrate 12 is fixed more firmly to the housing 11.

The remaining structure and effects of the fifth embodiment are the same as those of the third embodiment. Hence, the same or corresponding constituent elements are labeled with the same reference signs, and a description thereof is omitted.

As described above, the notched recess 22 in the fifth embodiment is spatially continuous from a position of the substrate 12 corresponding to the fixing portion 16 to two inner side surfaces of the housing 11. Therefore, the amount of ultraviolet light entering the first space 12a from the second space 12b at the time of attachment of the substrate 12 to the housing 11 is greater than in the third and fourth embodiments. A large amount of ultraviolet light is thus irradiated on the adhesive 17, further promoting hardening of the adhesive 17.

Furthermore, the light guide 21 formed as a rib from the fixing portion 16 to two side surfaces of the housing 11 positioned at right angles to each other is fixed to the fixing portion 16, allowing the substrate 12 to be attached more firmly to the housing 11. The portion of the substrate 12 closer to the housing 11 than the fixing portion 16 is dead space in which components cannot be arranged. Hence, a reduction in the area of the substrate 12 resulting from a larger notched recess 22 has little effect on the attachment of components.

Figure 11:
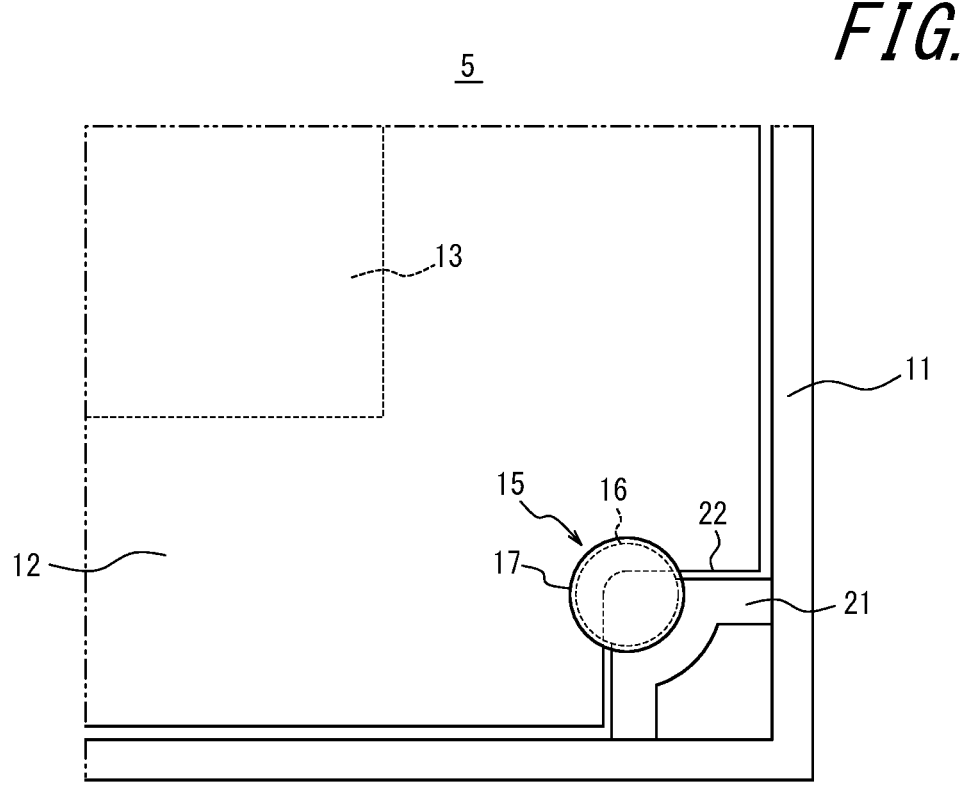
FIG. 11 is a top view of another example of a portion of the lens unit in the fifth embodiment.

In the fifth embodiment, the light guide 21 may be omitted in the transmissive portion 18, as illustrated in FIG. 11. Even in this case, ultraviolet light can be guided by the light guide 21 located in the notched recess 22 to enter the second space 12b, and hardening of the adhesive 17 is promoted by the ultraviolet light passing through the fixing portions 16 arranged in the second space 12b.

Sixth Embodiment

Next, the sixth embodiment of the present disclosure is described with reference to the drawings.

Figure 12:
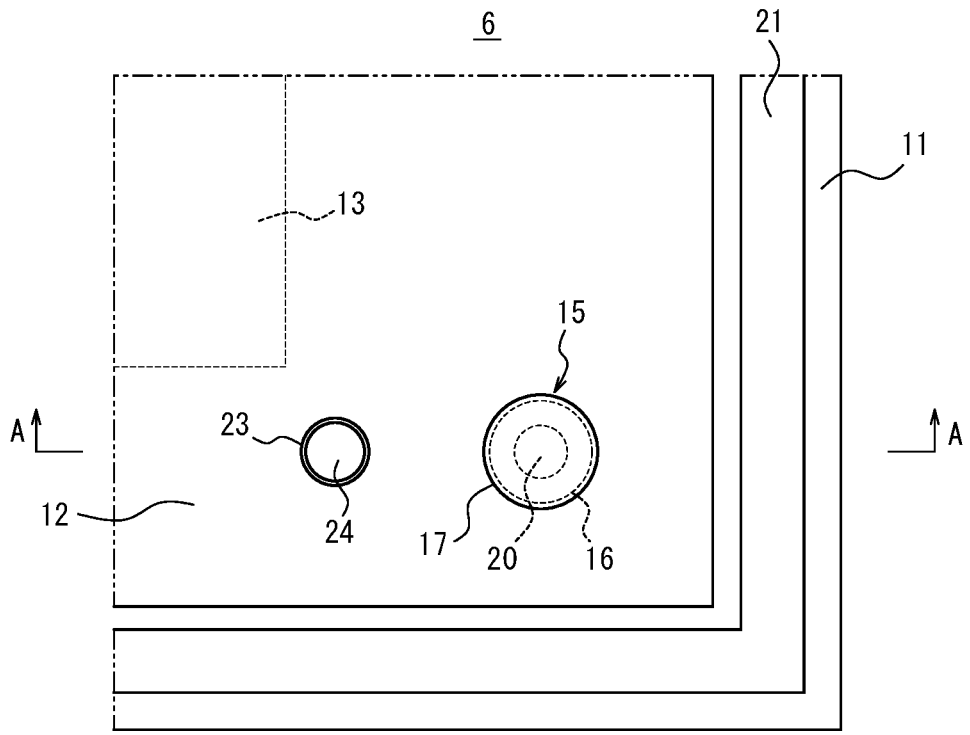
FIG. 12 is a top view of a portion of a lens unit in a sixth embodiment.

Like the lens unit 1 according to the first embodiment, a lens unit 6 according to the sixth embodiment includes a housing 11, a substrate 12, an image sensor 13, an imaging optical system 14, a bonding structure 15, and the like. As illustrated in FIG. 12, the bonding structure 15 differs by further including holes 23, which are openings in the substrate 12 connecting the first space 12a and the second space 12b. A light guide 21 in the sixth embodiment is designated the "first light guide 21" and is similar to the light guide 21 that is included in the bonding structure 15 of the lens unit 1 according to the first embodiment in the transmissive portion 18 between the housing 11 and the substrate 12.

Figure 13:
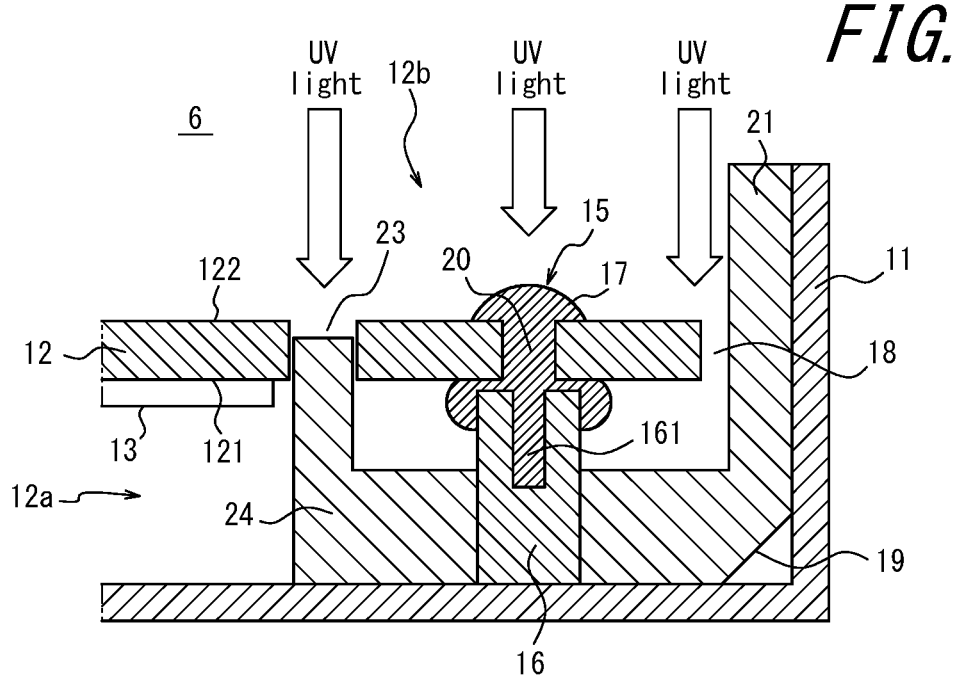
FIG. 13 is a cross-section of a portion of the lens unit in FIG. 12.

A second light guide 24 including ultraviolet transmissive material is inserted as a boss in the hole 23, as illustrated in FIG. 13, which is a cross-section along the AA line of FIG. 12.

The second light guide 24 is provided integrally with the housing 11 and is inserted in the hole 23 of the substrate 12 as a boss. The second light guide 24 thus fixes the substrate 12 while preventing displacement in the surface direction. The second light guide 24 is also formed integrally with the fixing portion 16, as illustrated in FIG. 13, which is a cross-section along the AA line of FIG. 12. Instead of being formed integrally with the housing 11, the second light guide 24 may be a member for fixing attached to the housing 11.

The remaining structure and effects of the sixth embodiment are the same as those of the first embodiment. Hence, the same or corresponding constituent elements are labeled with the same reference signs, and a description thereof is omitted.

As described above, a hole 23 is provided in the sixth embodiment, and the second light guide 24 is inserted in the hole 23. The ultraviolet light entering the second space 12b from the outside at the time of attachment of the substrate 12 to the housing 11 is therefore guided by the second light guide 24 inserted in the hole 23 and reaches the outside of the fixing portion 16. The light reaching the outside of the fixing portion 16 passes through the fixing portion 16, which includes ultraviolet transmissive material, and irradiates the adhesive 17 injected into the hole 161 of the fixing portion 16. A greater amount of ultraviolet light is thus irradiated on the adhesive 17, promoting hardening of the adhesive 17.

The present disclosure is not limited to the above embodiments, and a variety of modifications and changes are possible. For example, applications of the bonding structure 15 of the present disclosure are not limited to lens units. The bonding structure 15 can be applied to a variety of other devices that connect a substrate or the like to the housing 11. The bonding structure 15 may be used for the arrangement of an optical element. The shape of the opening between the first space 12a and the second space 12b is not limited to the shapes in the above embodiments and may have any of a variety of shapes. For example, the through-hole 20 that is the opening may have any of a variety of shapes, such as a rectangular or elliptical shape, and the notched recess 22 may have any of a variety of shapes, such as a circular or elliptical shape. Furthermore, the hole 161 in the fixing portion 16 in the above embodiments is circular in top view but may instead have another shape, such as a rectangular or elliptical shape.

REFERENCE SIGNS LIST 1,2,3,4,5,6 Lens unit
7 Imaging apparatus
8 Vehicle
9 On-vehicle camera
11 Housing
12 Substrate
12a First space
12b Second space
13 Image sensor
14 Imaging optical system
15 Bonding structure
16 Fixing portion
17 Adhesive
18 Transmissive portion
19 Reflector
20 Through-hole
21 Light guide (first light guide)
22 Notched recess
23 Hole
24 Second light guide
121 First surface
122 Second surface
161 Hole

The invention claimed is:

1. A bonding structure for fixing a plate member inside a housing storing the plate member, the bonding structure comprising:
  an opening connecting a first space, surrounded by the housing and a first surface of the plate member facing the housing, with a second space located by a second surface of the plate member opposite the first surface;
  a fixing portion facing the first surface, positioned in accordance with the opening, and including an ultraviolet transmissive material;
  an ultraviolet curing adhesive located at the opening and fixing the fixing portion and the plate member to each other; and
  a transmissive portion located at a periphery of a side surface of the plate member and transmitting ultraviolet light.

2. The bonding structure of claim 1, further comprising a light guide including the ultraviolet transmissive material and arranged in the first space to be spatially continuous from the transmissive portion to the fixing portion.

3. The bonding structure of claim 2, wherein the light guide is spatially continuous from the second space to the fixing portion.

4. The bonding structure of claim 1, wherein the opening is one or both of a through-hole passing through the plate member and a notched recess provided in a portion of an outer edge of the plate member.

5. The bonding structure of claim 4, further comprising a light guide including the ultraviolet transmissive material and arranged in the first space to be spatially continuous from the transmissive portion to the fixing portion,
  wherein the light guide is partially positioned in the notched recess.

6. The bonding structure of claim 1, further comprising a reflector arranged in the first space to reflect the ultraviolet light incident from the opening towards a bonding portion between the fixing portion and the plate member.

7. The bonding structure of 1,
  wherein the fixing portion comprises a hole from a section of the fixing portion facing the plate member towards the housing; and
  wherein the ultraviolet curing adhesive is located in the hole.

8. An imaging apparatus comprising:
  a substrate;
  an imaging optical system;
  an image sensor mounted on the substrate;
  a housing storing the substrate, the image sensor, and the imaging optical system; and
  a bonded structure fixing the substrate in the housing;
  wherein the bonded structure comprises:
    an opening connecting a first space, surrounded by the housing and a first surface of the substrate facing the housing, with a second space located by a second surface of the substrate opposite the first surface;
    a fixing portion facing the first surface, positioned in accordance with the opening, and including an ultraviolet transmissive material;

an ultraviolet curing adhesive located at the opening and fixing the fixing portion and the substrate to each other; and a transmissive portion located at a periphery of a side surface of the substrate and transmitting ultraviolet light.

9. An on-vehicle camera comprising:

an imaging apparatus;

wherein the imaging apparatus comprises:
- a substrate;
- an imaging optical system;
- an image sensor mounted on the substrate;
- a housing storing the substrate, the image sensor, and the imaging optical system; and
- a bonded structure fixing the substrate in the housing;

wherein the bonded structure comprises:
- an opening connecting a first space, surrounded by the housing and a first surface of the substrate facing the housing, with a second space located by a second surface of the substrate opposite the first surface;
- a fixing portion facing the first surface, positioned in accordance with the opening, and including an ultraviolet transmissive material;
- an ultraviolet curing adhesive located at the opening and fixing the fixing portion and the substrate to each other; and
- a transmissive portion located at a periphery of a side surface of the substrate and transmitting ultraviolet light.

\* \* \* \* \*